US010681609B2

(12) United States Patent
Brown (10) Patent No.: US 10,681,609 B2
(45) Date of Patent: Jun. 9, 2020

(54) LOCATION-BASED CALL REROUTING SYSTEMS

(71) Applicant: Jacob Brown, Green Bay, WI (US)

(72) Inventor: Jacob Brown, Green Bay, WI (US)

( * ) Notice: Subject to any disclaimer, the term of this patent is extended or adjusted under 35 U.S.C. 154(b) by 0 days.

(21) Appl. No.: 16/383,000

(22) Filed: Apr. 12, 2019

(65) Prior Publication Data

US 2019/0239141 A1 Aug. 1, 2019

(51) Int. Cl.
*H04W 40/20* (2009.01)
*H04M 3/42* (2006.01)
*H04L 29/06* (2006.01)
*H04W 60/00* (2009.01)
*H04W 76/20* (2018.01)
*H04W 76/10* (2018.01)
*H04W 48/08* (2009.01)
*H04W 64/00* (2009.01)
*H04W 4/021* (2018.01)
*H04W 84/04* (2009.01)

(52) U.S. Cl.
CPC ......... *H04W 40/20* (2013.01); *H04L 65/1006* (2013.01); *H04M 3/42348* (2013.01); *H04W 4/021* (2013.01); *H04W 48/08* (2013.01); *H04W 60/00* (2013.01); *H04W 64/003* (2013.01); *H04W 76/10* (2018.02); *H04W 76/20* (2018.02); *H04W 84/045* (2013.01)

(58) Field of Classification Search
CPC ..... H04W 40/20; H04W 76/20; H04W 76/10; H04W 4/021; H04W 48/08; H04W 60/00; H04W 64/003; H04W 84/045; H04L 65/1006; H04M 3/42348

USPC ........................................................ 455/433
See application file for complete search history.

(56) References Cited

U.S. PATENT DOCUMENTS

| 8,116,291 B2* | 2/2012 | Annamalai | H04W 64/00 370/338 |
| 8,929,856 B1* | 1/2015 | Kamboh | H04L 61/1511 455/404.2 |
| 2007/0060097 A1* | 3/2007 | Edge | H04M 7/006 455/404.1 |

(Continued)

OTHER PUBLICATIONS

3GPP TS 23.167 V15.4.0 (Dec. 2018) (Year: 2018).*

*Primary Examiner* — William Nealon
(74) *Attorney, Agent, or Firm* — Miller IP Law, LLC (57) ABSTRACT

A method, system, apparatus, and/or device for rerouting a location-based phone call. The method, system, apparatus, and/or device may include a home cellular network and a location-based routing platform. The home cellular network may be configured to receive registration data indicating a cellular tower communicatively coupled with a cellular device, receive a location-based telephone call from the cellular device, and send the registration data to a location-based routing platform. The location-based routing platform may be configured to receive the registration data from the home cellular network, determine a location of the cellular device, and send a redirection request to the home cellular network for the home cellular network to redirect the location-based telephone call to a local phone system associated with the location of the cellular device, where the home cellular network is configured to redirect the location-based telephone call to the local phone system.

18 Claims, 2 Drawing Sheets

(56) References Cited

U.S. PATENT DOCUMENTS

| | | | |
|---|---|---|---|
| 2009/0191841 A1* | 7/2009 | Edge | H04W 4/90 455/404.1 |
| 2010/0029272 A1* | 2/2010 | McCann | H04W 4/16 455/433 |
| 2011/0201299 A1* | 8/2011 | Kamdar | H04L 65/1069 455/404.1 |
| 2018/0077283 A1* | 3/2018 | Ferguson | H04W 4/90 |

* cited by examiner

LOCATION-BASED CALL REROUTING SYSTEMS

BACKGROUND

Routing calls through networks has become increasingly complex and certain calls are routed based on the originating location of the caller. For example, an N11 code (N-one-one) is a three-digit telephone number used in abbreviated dialing in some telephone administrations of the North American Numbering Plan (NANP). The N11 codes are associated with specials services provided in a local area where an individual places a call. The designation for special use in the NANP prevents the N11 codes use as an area code or central office prefix and also prevents an area code from being part of the phone number dialed to indicate the local area the individual is inquiring about.

BRIEF DESCRIPTION OF THE DRAWINGS

The present description will be understood more fully from the detailed description given below and from the accompanying drawings of various embodiments of the present embodiment, which is not to be taken to limit the present embodiment to the specific embodiments but are for explanation and understanding.

DETAILED DESCRIPTION

The disclosed location-based call rerouting systems will become better understood through a review of the following detailed description in conjunction with the figures. The detailed description and figures provide merely examples of the various embodiments described herein. Those skilled in the art will understand that the disclosed examples may be varied, modified, and altered and not depart from the scope of the embodiments described herein. Many variations are contemplated for different applications and design considerations; however, for the sake of brevity, the contemplated variations may not be individually described in the following detailed description.

Throughout the following detailed description, examples of various location-based call rerouting systems are provided. Related features in the examples may be identical, similar, or dissimilar in different examples. For the sake of brevity, related features will not be redundantly explained in multiple examples. Instead, the use of related feature names will cue the reader that the feature with a related feature name may be similar to the related feature in an example explained previously. Features specific to a given example will be described in that particular example. The reader is to understand that a given feature need not be the same or similar to the specific portrayal of a related feature in any given figure or example.

An N11 code (N-one-one) is a three-digit telephone number used in abbreviated dialing in some telephone administrations of the North American Numbering Plan (NANP). The N11-numbers are used to access special services. For example, the N11 code 2-1-1 may be for community services and information; the N11 code 3-1-1 may be for municipal government services; the N11 code 4-1-1 may be for directory assistance; the N11 code 5-1-1 may be for traffic information or police non-emergency services; the N11 code 6-1-1 may be for telephone company customer service and repair; the N11 code 7-1-1 may be for telecommunications device for the deaf (TDD) and relay services for the deaf and hard of hearing; the N11 code 8-1-1 may be for underground public utility location or non-emergency health information and services; and the N11 code 9-1-1 may be for emergency services, such as police, fire, ambulance, and rescue services.

The N11 codes are associated with specials services provided in a local area where an individual places a call. For example, an individual located in Salt Lake City, Utah may dial the N11 code 2-1-1 to inquire regarding the community services and information for Salt Lake City, Utah. However, the designation for special use in the NANP prevents the N11 codes use as an area code or central office prefix and also prevents an area code from being part of the phone number dialed to indicate the local area the individual is inquiring about.

Conventionally, when the phone call is placed on a landline, the phone system may determine the local area the individual in placing the call by determining the location associated with the landline, such as an address of the landline or a node the landline call is routed through. When a conventional phone call is placed using a cellular device, the phone call may be routed through a local cellular tower to a local phone system associated with the area for the N11 call. For example, in a conventional single carrier (1×) radio transmission technology (1×RTT network), such as a $2^{nd}$ generation (2G) cellular network or third-generation (3G) cellular network, location-based calling may be implemented through mobile switching centers (MSCs) in the network. The MSCs may receive information identifying the cell or sector at which the call originated, and may use this information to route the call to an appropriate destination. However, when the phone call is placed over a home routed long term evolution (LTE) system, such as a voice over LTE (voLTE) system, the phone call may not be routed from a local cellular tower to the local phone system, but rather the phone call may be routed to a home cellular network, such as a home public mobile network (HPMN).

The home cellular network may not be located in the local area where the individual is placing the call. In one example, the home cellular network may be located near the residence where the individual resides. In another example, the home cellular network may be located at a central location or headquarters of the cellular service provider. When the home routed LTE call is routed through the home cellular network, the call may not be routed directly from the local cellular tower to the local phone system causing the home routed LTE call to not be properly routed. Accordingly, when the N11 call is made the call will be routed to the phone system where the individual's residence is located and/or to the central location or headquarters of the cellular service provider. When the individual is not at their residence or near the central location or headquarters of the cellular service provider, the N11 call may be routed to the wrong local phone system and the individual may receive information for the wrong local area.

Implementations of the disclosure address the above-mentioned deficiencies and other deficiencies by providing methods, systems, devices, and apparatuses that provide a home cellular network with location information of a call placed by an individual within a home routed LTE system. An advantage of the location-based call rerouting system may be to reroute a call with an N11 code or other location-based phone call services to the correct local phone system to provide the local information to the caller.

Figure 1:
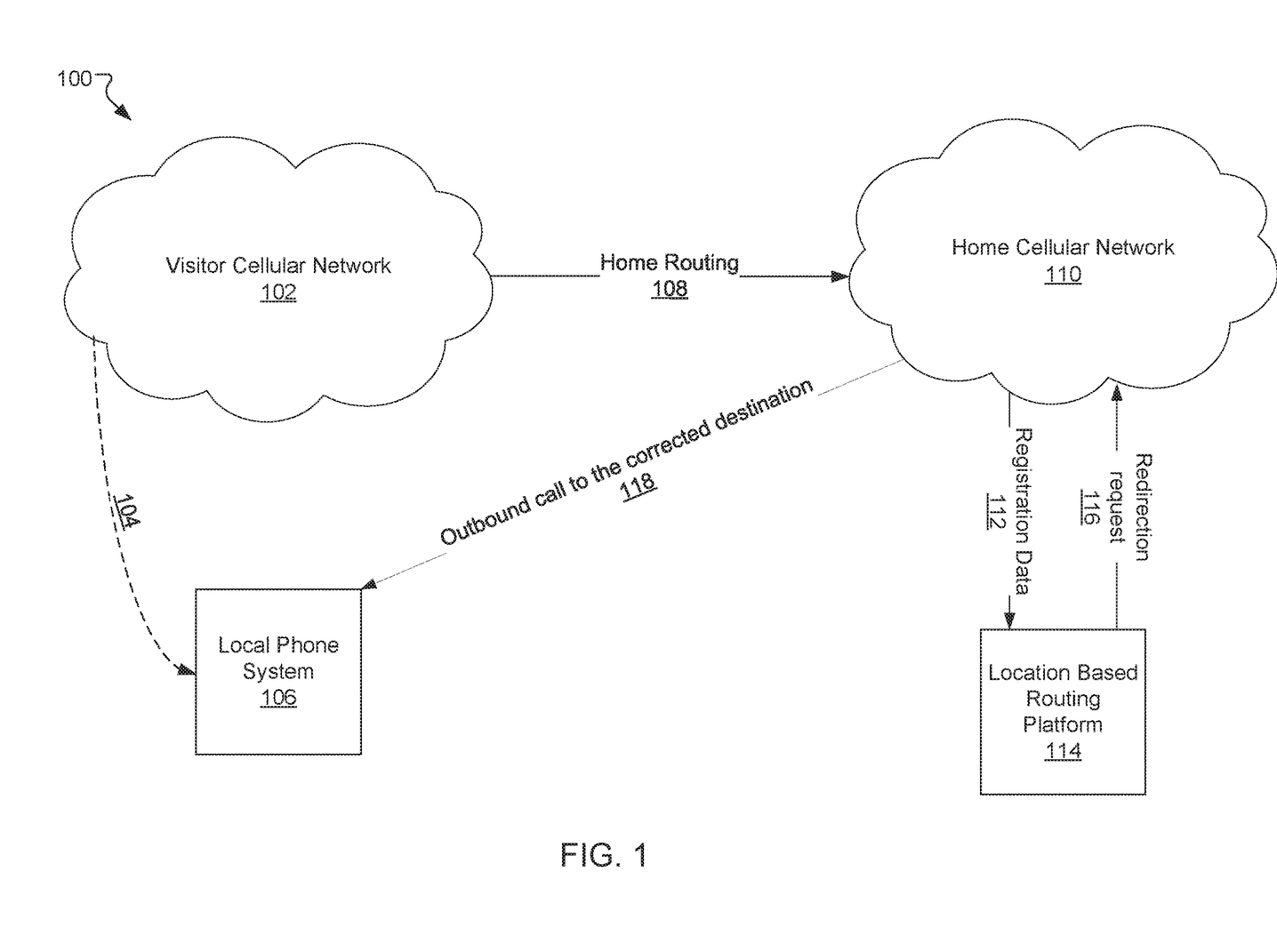
FIG. 1 illustrates a location-based call rerouting system to reroute a call with for location-based call services to the correct local phone system, according to an embodiment.

FIG. 1 illustrates a location-based call rerouting system 100 to reroute a call for location-based call services to the correct local phone system, according to an embodiment. The location-based call rerouting system 100 may include a visitor cellular network 102, a local phone system 106, a home cellular network 110, and a location-based routing platform 114. In one embodiment, an individual (also referred to as a caller) may place a phone call to a location-based call service in a visitor cellular network 102. In one embodiment, the visitor cellular network 102 may be a roaming cellular network that is outside the coverage area of the cellular network for the cellular service provider of a caller's cellular device. In another embodiment, the visitor cellular network may be an area located outside an area registered as the location where the caller's residence is located.

In one embodiment, when the caller places a call in the visiting cellular network 102 over a 1×RTT network, such as a 2G cellular network or a 3G cellular network, to a location-based call service, the call 104 may be implemented through a mobile switching center (MSC) in the visitor cellular network 102. The MSC may receive information identifying the cell or sector at which a call originated and may use this information to route the call 104 to a local phone system 106 associated with the geographic area where the caller is located. The local phone system 106 may provide information and/or services to the caller based on the geographic area where the caller is located. For example, when the caller dials the N11 code 2-1-1 for community services and information, the local phone system 106 may provide the caller with information about community services for the geographic area or region where the caller is located. In another example, an N11 code and/or other location-based call codes may be short calling codes that may be defined for different programmed services that are routed based on the user location, such as a calling a local taxi, ordering food, and so forth.

In another embodiment, when the caller places a call in the visiting cellular network 102 over a home routed LTE system to a location-based call service, the home routed LTE system may route the call 108 to a home cellular network 110. The home cellular network 110 may then send registration data 112 associated with the call 108 to a location-based routing platform 114. The home cellular network 110 may maintain a database of the registration data 112 when a cellular device registers with a cellular tower. For example, the visitor cellular network and/or the home cellular network may include cellular towers. The cellular towers may transmit electromagnetic radio waves (also referred to as radio frequency energy) in multiple directions or omnidirectionally.

In one example, when the cellular device is powered on, the cellular device may receive the electromagnetic radio waves from the cellular tower closest to the cellular device. When the cellular device receives the electromagnetic radio waves, the cellular device may send connection information to the cellular tower so that the cellular device may initiate a communication channel with the cellular tower. When the cellular device initiates the communication channel with the cellular tower, the cellular tower may send registration data 112 to the home cellular network to indicate that the cellular tower is connected with the cellular device. Similarly, when the cellular device moves out of the range of the cellular tower and/or is located closer in distance to another cellular tower, the cellular device may disconnect from the current cellular tower and establish a communication channel with the new cellular tower. When the cellular device establishes the communication channel with the new cellular tower, the new cellular tower may send registration data 112 to the home cellular network 110 to indicate that the new cellular tower is connected with the cellular device.

The registration data 112 may include identification information associated with the cellular tower, location information of the cellular tower, a time of day the cellular device established the communication channel with the cellular tower, and so forth. The home cellular network 110 may maintain a database of the registration data 112. In one embodiment, the home cellular network 110 may maintain a real-time database of the current cellular devices connected to cellular towers. In another embodiment, the home cellular network 110 may update the database periodically or at defined time intervals.

The location-based routing platform 114 may use the registration data 112 to determine a geographic location from which the call 108 originated from. For example, the location-based routing platform 114 may maintain a database of the locations of different cellular towers located across a geographic region. When the location-based routing platform 114 receives the registration data 112, the location-based routing platform 114 may identify the current cellular tower that the cellular device has a communication channel with. The location-based routing platform 114 may then query the database indicating the locations of the different cellular towers.

When the location-based routing platform 114 identifies the cellular tower within the database, the location-based routing platform 114 may identify the location information associated with the cellular tower to determine an approximate location where the call 108 originated from. The location where the call 108 originated from may be an approximate location because the cellular tower may communicate with the cellular device with in geographic region covered by the cellular tower, so the location of the cellular device is within that geographic region. The registration data may be converted to location coordinates that may be geo-fenced to specific or approximate areas that are associated with the proper destination translation.

In response to determining the geographic location the call 108 originated from, the location-based routing platform 114 may send a redirection request 116 to the home cellular network 110. In one example, the redirection request may include a request for the home cellular network 110 to reroute the call 108 to the correct destination number for the location-based call service. In another example, the location-based routing platform 114 may receive the registration data 112 from the home cellular network 110 via proxy feed and send the redirection request 116 over a session initiation protocol (SIP) trunk.

In one embodiment, the redirection request 116 may generate a location identifier based on a cell identifier and sector identifier associated with the registration information. The redirection request 116 may also include a header associated with the call 108 that includes a call origination location identifier. The call 108 may be forwarded to a particular mobile switching center based on the redirection request 116 and the mobile switching center may then forward the call 108 to the appropriate destination. The redirection request 116 may indicate the local phone system 106 that the call 108 may be rerouted to so that the call 108 may be routed 118 to the local phone system 106 associated with the geographic area or region for the location-based call service.

Figure 2:
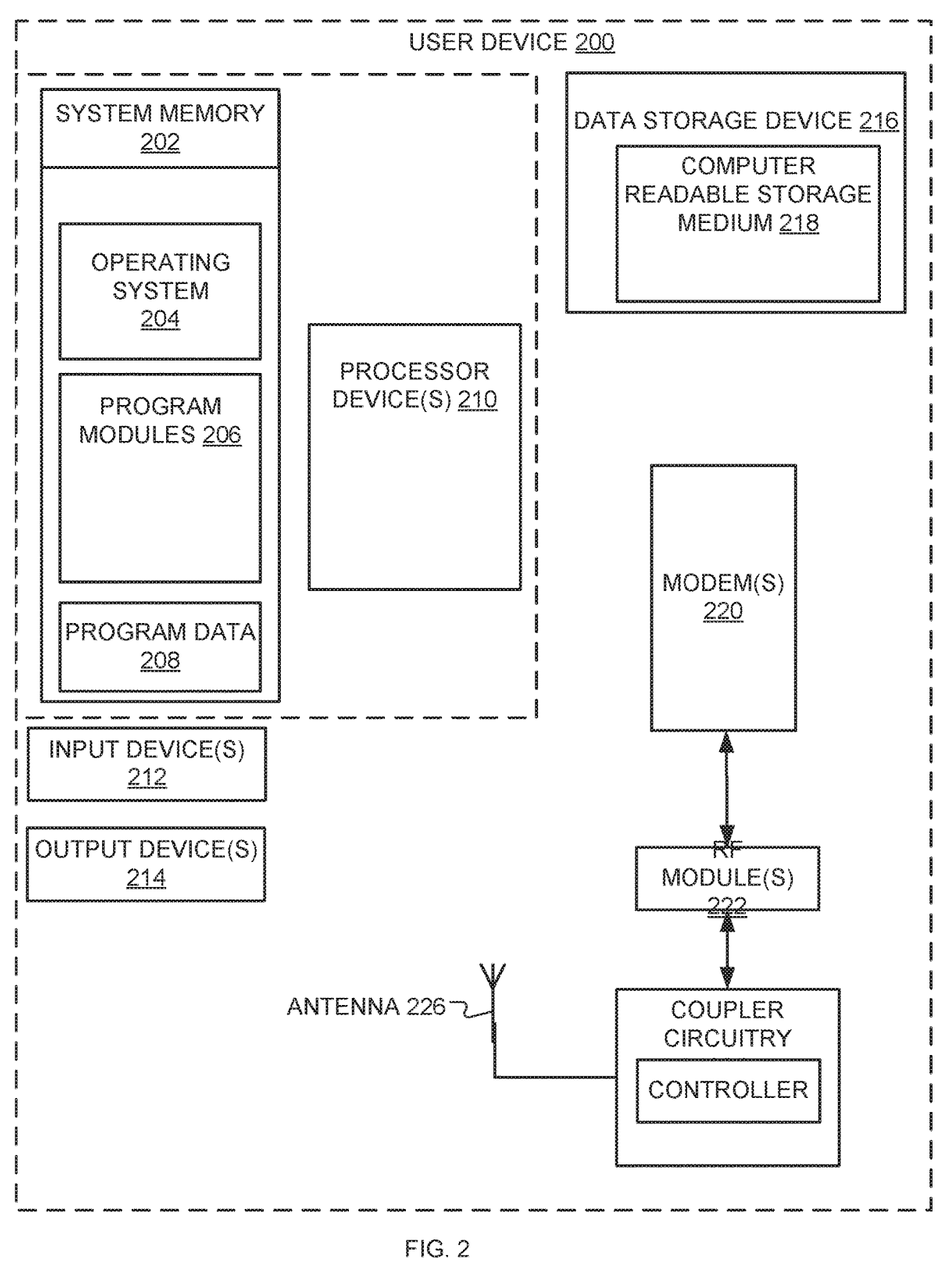
FIG. 2 is a block diagram of a user device with a processing device in which implementations of methods, systems, devices, or apparatuses in FIG. 1 may be implemented.

FIG. 2 is a block diagram of a user device 200 with a processing device in which implementations of methods, systems, devices, or apparatuses in FIG. 1 may be implemented. The user device 200 may display and/or implement the method and GUIs of FIG. 1. The user device 200 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 200 may be any portable or stationary user device. For example, the user device 200 may be an intelligent voice control and speaker system. Alternatively, the user device 200 can be any other device used in a WLAN network (e.g., Wi-Fi® network), a WAN network, or the like.

The user device 200 includes one or more processing device(s) 210, such as one or more CPUs, microcontrollers, field programmable gate arrays, or other types of processing devices. The user device 200 also includes system memory 202, which may correspond to any combination of volatile and/or non-volatile storage mechanisms. The system memory 202 stores information that provides operating system 204, various program modules 206, program data 208, and/or other components. In one implementation, the system memory 202 stores instructions of the method and/or process as described herein. The user device 200 performs functions by using the processing device(s) 210 to execute instructions provided by the system memory 202.

The user device 200 also includes a data storage device 216 that may be composed of one or more types of removable storage and/or one or more types of non-removable storage. The data storage device 216 includes a computer-readable storage medium 218 on which is stored one or more sets of instructions embodying any of the methodologies or functions described herein. Instructions for the program modules 206 may reside, completely or at least partially, within the computer-readable storage medium 218, system memory 202 and/or within the processing device(s) 210 during execution thereof by the user device 200, the system memory 202 and the processing device(s) 210 also constituting computer-readable media. The user device 200 may also include one or more input devices 212 (keyboard, mouse device, specialized selection keys, etc.) and one or more output devices 214 (displays, printers, audio output mechanisms, etc.).

The user device 200 further includes modem 220 to allow the user device 200 to communicate via a wireless network(s) (e.g., such as provided by the wireless communication system) with other computing devices, such as remote computers, an item providing system, and so forth. The modem 220 can be connected to zero or more RF modules 222. The zero or more RF modules 222 can be connected to zero or more coupler circuitry 224. The RF modules 222 and/or the coupler circuitry 224 may be a WLAN module, a WAN module, PAN module, or the like. Antenna 226 is coupled to the coupler circuitry 224, which is coupled to the modem 220 via the RF modules 222. The modem 220 allows the user device 200 to handle both voice and non-voice communications (such as communications for text messages, multimedia messages, media downloads, web browsing, etc.) with a wireless communication system. The modem 220 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi® technology, Long Term Evolution (LTE) and LTE Advanced (sometimes generally referred to as 4G), etc.

The modem 220 may generate signals and send these signals to antenna 226 via coupler circuitry 224 as described herein. User device 200 may additionally include a WLAN module, a GPS receiver, a PAN transceiver and/or other RF modules. The coupler circuitry 224 may additionally or alternatively be connected to one or more of coupler arrays. The antenna 226 may be configured to transmit in different frequency bands and/or using different wireless communication protocols. The antenna 226 may be directional, omni-directional, or non-directional antennas. In addition to sending data, the antenna 226 may also receive data, which is sent to appropriate RF modules 222 connected to the antenna 226.

In one implementation, the user device 200 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one implementation, the first wireless connection is associated with a first resonant mode of an antenna structure that operates at a first frequency band and the second wireless connection is associated with a second resonant mode of the antenna structure that operates at a second frequency band. In another implementation, the first wireless connection is associated with a first antenna element and the second wireless connection is associated with a second antenna element. In other implementations, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though modem 220 is shown to control transmission and reception via the antenna 226, the user device 200 may alternatively include multiple moderns, each of which is configured to transmit/receive data via a different antenna and/or wireless transmission protocol.

The user device 200 delivers and/or receives items, upgrades, and/or other information via the network. For example, the user device 200 may download or receive items from an item providing system. The item providing system receives various requests, instructions and other data from the user device 200 via the network. The item providing system may include one or more machines (e.g., one or more server computer systems, routers, gateways, etc.) that have processing and storage capabilities to provide the above functionality. Communication between the item providing system and the user device 200 may be enabled via any communication infrastructure. One example of such an infrastructure includes a combination of a wide area network (WAN) and wireless infrastructure, which allows a user to use the user device 200 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected to the network. The WLAN hotspots can be created by products based on IEEE 802.11x standards for the Wi-Fi® technology by Wi-Fi® Alliance. Another of the wireless communication systems may be a wireless carrier system that can be implemented using various data processing equipment, communication towers, etc. Alternatively, or in addition, the wireless carrier system may rely on satellite technology to exchange information with the user device 200.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user device 200 is variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 200 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that implementations may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present implementations are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other implementations will be apparent to those of skill in the art upon reading and understanding the above description. The scope of the present implementations should, therefore, be determined with reference to the appended claims, along with the full scope of equivalents to which such claims are entitled.

In the above description, numerous details are set forth. It will be apparent, however, to one of ordinary skill in the art having the benefit of this disclosure, that implementations may be practiced without these specific details. In some instances, well-known structures and devices are shown in block diagram form, rather than in detail, in order to avoid obscuring the description.

Although the implementations may be herein described with reference to specific integrated circuits, such as in computing platforms or micro-processing devices, other implementations are applicable to other types of integrated circuits and logic devices. Similar techniques and teachings of implementations described herein may be applied to other types of circuits or semiconductor devices. For example, the disclosed implementations are not limited to desktop computer systems or Ultrabooks™ and may be also used in other devices, such as handheld devices, tablets, other thin notebooks, systems on a chip (SOC) devices, and embedded applications. Some examples of handheld devices include cellular devices, Internet protocol devices, smartphones, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below.

Although the implementations are herein described with reference to a processing device or processing device, other implementations are applicable to other types of integrated circuits and logic devices. Similar techniques and teachings of implementations of the present invention may be applied to other types of circuits or semiconductor devices that may benefit from higher pipeline throughput and improved performance. The teachings of implementations of the present invention are applicable to any processing device or machine that performs data manipulations. However, the present invention is not limited to processing devices or machines that perform 512 bit, 256 bit, 128 bit, 64 bit, 32 bit, and/or 16 bit data operations and may be applied to any processing device and machine in which manipulation or management of data is performed. In addition, the following description provides examples, and the accompanying drawings show various examples for the purposes of illustration. However, these examples should not be construed in a limiting sense as they are merely intended to provide examples of implementations of the present invention rather than to provide an exhaustive list of all possible implementations of implementations of the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or media devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances, addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

Implementations described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMS), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present implementations. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present implementations.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description below. In addition, the present implementations are not described with reference to any particular programming language. It will be appreciated that a variety of programming languages may be used to implement the teachings of the implementations as described herein.

The above description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

It is to be understood that the above description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The disclosure above encompasses multiple distinct embodiments with independent utility. While these embodiments have been disclosed in a particular form, the specific embodiments disclosed and illustrated above are not to be considered in a limiting sense as numerous variations are possible. The subject matter of the embodiments includes the novel and non-obvious combinations and sub-combinations of the various elements, features, functions and/or properties disclosed above and inherent to those skilled in the art pertaining to such embodiments. Where the disclosure or subsequently filed claims recite "a" element, "a first" element, or any such equivalent term, the disclosure or claims is to be understood to incorporate one or more such elements, neither requiring nor excluding two or more such elements.

Applicant(s) reserves the right to submit claims directed to combinations and sub-combinations of the disclosed embodiments that are believed to be novel and non-obvious. Embodiments embodied in other combinations and sub-combinations of features, functions, elements and/or properties may be claimed through amendment of those claims or presentation of new claims in the present application or in a related application. Such amended or new claims, whether they are directed to the same embodiment or a different embodiment and whether they are different, broader, narrower or equal in scope to the original claims, are to be considered within the subject matter of the embodiments described herein.

The invention claimed is:

1. A system, comprising:
    a cellular device configured to:
        initiate a first communication channel with a visitor cellular network; and
        initiate a location-based telephone call;
    the visitor cellular network configured to:
        generate registration data for the first communication channel;
        receive the location-based telephone call from the cellular device; and
        forward the location-based telephone call to a home cellular network;
    the home cellular network configured to:
        receive the registration data from the visitor cellular network;
        receive the location-based telephone call from the visitor cellular network; and
        send the registration data to a location-based routing platform;
    the location-based routing platform configured to:
        receive the registration data from the home cellular network;
        determine a location of the cellular device; and
        send a redirection request to the home cellular network for the home cellular network to redirect the location-based telephone call to a local phone system associated with the location of the cellular device, wherein the home cellular network is configured to redirect the location-based telephone call to the local phone system in response to receiving the redirection request.

2. The system of claim 1, further comprising the local phone system configured to:
    receive the location-based telephone call from the home cellular network; and
    provide information or services associated with the location to the cellular device.

3. The system of claim 1, wherein the visitor cellular network is a roaming cellular network that is outside a coverage area of a cellular network of a cellular service provider for the cellular device.

4. The system of claim 1, wherein the visitor cellular network is a cellular network located in an area outside a location of a residence of an individual making the location-based telephone call.

5. The system of claim 1, wherein the home cellular network is configured to maintain a database of the registration data when a cellular device registers with one or more cellular towers over time.

6. The system of claim 5, wherein when the cellular device is powered on the cellular device is configured to:
    receive an electromagnetic radio waves from a first cellular tower closest to the cellular device; and
    in response to the cellular device receiving the electromagnetic radio waves, send connection information to the first cellular tower to initiate the first communication channel with the first cellular tower, wherein in response to the cellular device initiating the first communication channel with the first cellular tower, the first cellular tower is configured to send registration data to the home cellular network indicating that the first cellular tower is connected with the cellular device.

7. The system of claim 6, wherein when the cellular device moves out of the range of the first cellular tower or is located closer to a second cellular tower, the cellular device is configured to disconnect from the first cellular tower and establish a second communication channel with the second cellular tower.

8. The system of claim 7, wherein in response to the cellular device establishing the second communication channel with the second cellular tower, the second cellular tower is configured to send registration data to the home cellular network indicating that the second cellular tower is connected with the cellular device.

9. The system of claim 1, wherein the registration data comprises:
    identification information associated with a cellular tower located within the visitor cellular network;
    location information of the cellular tower; or
    a time of day the cellular device established the first communication channel with the cellular tower.

10. The system of claim 1, wherein the home cellular network is configured to maintain a first database of the registration data indicating one or more cellular towers in the visitor cellular network that the cellular device has initiated a communication channels with over a period of time.

11. The system of claim 10, wherein the location-based routing platform is configured to maintain a second database comprises information indicating locations of a plurality of cellular towers located across a geographic region.

12. The system of claim 11, wherein the location-based routing platform is configured to:
identify a current cellular tower that the cellular device has a communication channel with based on the registration data; and
query the second database to determine a location of the current cellular tower based on the registration data to determine the location of the cellular device.

13. The system of claim 12, wherein the determined location of the cellular device is an approximate location within geographic region covered by the current cellular tower.

14. A system, comprising:
a cellular device configured to:
initiate a communication channel with a cellular tower of a visitor cellular network; and
initiate a location-based telephone call;
the visitor cellular network configured to:
generate registration data for the communication channel;
receive the location-based telephone call from the cellular device; and
forward the location-based telephone call to a home cellular network;
a home cellular network configured to:
receive registration data indicating the cellular tower communicatively coupled with a cellular device;
receive a location-based telephone call from the cellular device via the cellular tower of the visitor cellular network; and
send the registration data to a location-based routing platform;
the location-based routing platform configured to:
receive the registration data from the home cellular network;
determine a location of the cellular device; and
send a redirection request to the home cellular network for the home cellular network to redirect the location-based telephone call to a local phone system associated with the location of the cellular device, wherein the home cellular network is configured to redirect the location-based telephone call to the local phone system in response to receiving the redirection request.

15. The system of claim 14, wherein the location-based routing platform is configured to convert the registration data to geo-fenced location coordinates indicating a location of the cellular device.

16. A method, comprising:
initiating, by a cellular device, a communication channel with a visitor cellular network;
initiating, by the cellular device, a location-based telephone call;
generating, by the visitor cellular network, registration data for the cellular device initiated communication channel;
receiving, by the visitor cellular network, the location-based telephone call from the cellular device;
forwarding, by the visitor cellular network, the location-based telephone call to a home cellular network;
receiving, by the home cellular network from the visitor cellular network, the registration data from the visitor cellular network;
receiving, by the home cellular network from the visitor cellular network, the location-based telephone call;
sending, by the home cellular network, the registration data to a location-based routing platform;
receiving, by the location-based routing platform, the registration data from the home cellular network;
determining, by the location-based routing platform, a location of the cellular device;
sending, by the location-based routing platform, a redirection request to the home cellular network for the home cellular network to redirect the location-based telephone call to a local phone system associated with the location of the cellular device; and
redirecting, by the home cellular network, the location-based telephone call to the local phone system in response to receiving the redirection request.

17. The method of claim 16, further comprising:
receiving the registration data at the location-based routing platform over a proxy feed from the home cellular network; and
sending the redirection request over a session initiation protocol (SIP) trunk.

18. The method of claim 16, further comprising:
receiving, by the local phone system, the location-based telephone call from the home cellular network; and
providing, by the local phone system, information or services associated with the location to the cellular device.

* * * * *